Sept. 19, 1950 D. E. NORGAARD 2,523,051

REGULATED OSCILLATOR

Filed Oct. 1, 1947

Inventor:
Donald E. Norgaard,
by Merton D. Moore
His Attorney.

Patented Sept. 19, 1950

2,523,051

UNITED STATES PATENT OFFICE 2,523,051

REGULATED OSCILLATOR

Donald E. Norgaard, Scotia, N. Y., assignor to General Electric Company, a corporation of New York Application October 1, 1947, Serial No. 777,331

1 Claim. (Cl. 250—36)

My invention relates to electronic oscillators, and more particularly to such oscillators as are employed for the production of oscillatory voltage output over a wide range of frequencies.

In the case of many signal generators now in common use, the waveform of the output voltage is subject to such wide variations with frequency that many tests made with such equipment have little or no significance. It is a particular object of my invention to provide an oscillator which is capable of producing an output of substantially uniform waveshape over a wide range of frequencies.

It is a further object of my invention to provide an oscillator or signal source which produces sinusoidal output voltage of substantially constant amplitude over a wide frequency range.

Still another object of my invention is to provide improved means for adjusting the regulated amplitude of oscillation of such a signal source.

Figure 1:
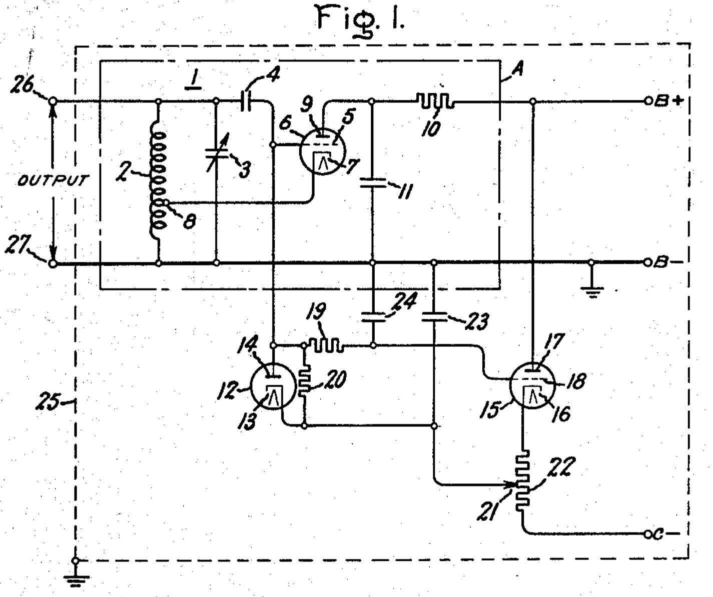

The features of my invention which I believe to be novel are set forth with particularity in the appended claim. My invention itself, however, together with further objects and advantages thereof, may best be understood by reference to the following description taken in connection with the accompanying drawing, in which Fig. 1 is a schematic circuit diagram of an oscillator embodying my invention, and the remaining figures are schematic diagrams of several alternative circuits which may be inserted within the broken-line rectangle A of Fig. 1. Like reference numerals signify like elements in the several figures.

In the circuit of Fig. 1, a capacitance-tuned parallel resonant circuit 1, comprising an inductance 2 and a variable capacitance 3, is coupled by means of a capacitor 4 to the control electrode 5 of a conventional high-vacuum oscillator tube 6. The cathode 7 of tube 6 is directly connected to a tap 8 on inductance 2 and the anode 9 of tube 6 is connected to the positive terminal of a suitable source of unidirectional operating potential, represented conventionally by B+, through a decoupling resistance 10. The customary bypass condenser 11 is provided between the anode 9 of tube 6 and the other terminal of the source, which is represented by B— and shown as grounded. The elements thus far described, within the broken-line rectangle A, essentially comprise a conventional oscillator from which the customary grid leak resistor has been omitted.

In order to regulate the output of the oscillation circuits, I provide an auxiliary control circuit comprising a high-vacuum diode 12, having cathode and anode electrodes 13, 14, respectvely, and a triode 15 having cathode, anode, and control electrodes 16, 17, 18, respectively. It will, of course, be understood that functionally similar devices may be employed in the places of the diode 12 and the triodes 6 and 15. The anode 14 of the diode 12 is connected directly to the control electrode 5 of the oscillator tube 6 and to the control electrode 18 of the triode 15 through a resistance 19. A resistance 20 is connected between the cathode 13 and the anode 14 of the diode 12. The cathode 13 of the diode 12 is connected to a variable tap 21 on a potentiometer 22, which is connected between the cathode 16 of the triode 15 and the negative terminal of a source of fixed direct operating voltage, represented conventionally by C—, the other terminal of which is connected to B— and ground. By-pass capacitors 23, 24 are provided between the cathode 13 of the diode 12 and ground, and between the grid 18 of the triode 15 and ground, respectively. The anode 17 of the triode 15 is connected directly to B+. Output voltages appears across the parallel resonant circuit 1 at terminals 26, 27.

When the circuit is connected in this manner, the tube 6 functions as a generator of oscillatory voltage. Furthermore, the output, taken across the resonant circuit 1, is substantially free from harmonic distortion and is very stable in frequency. The frequency of the signal generated by the oscillator is determined almost entirely by the resonant frequency of oscillatory circuit 1. In some applications, where especially precise output voltage is required, an electromagnetic shield, shown schematically as a dashed rectangle 25, may be provided, surrounding the entire system.

As previously mentioned, the portion of the circuit of Fig. 1, within the broken-line rectangle A is essentially the circuit of a conventional oscillator from which the customary grid leak resistor has been omitted. The operation of such an oscillator, employing a grid leak resistance, is well-known in the art. Customarily, in the absence of the control circuit, the waveform of the signal output appearing at terminals 26, 27 is not sinusoidal, since excessive feed-back is employed to insure oscillation over a wide range of frequency adjustment. With the control circuit, however, the signal voltage developed across resonant circuit 1 is applied to the anode 14 of the diode 12, causing the diode 12 to conduct during the positive peaks of the voltage wave. During the conduction periods of the diode 12, a charge accumulates on the coupling capacitor 4, the polarity of which effectively makes the bias voltage on the grid 5 of the oscillator tube 6 more negative.

It is apparent, then, that both alternating and direct components of voltage appear at the anode 14 of the diode 12. The combination of the series resistance 19 and the shunt capacitance 24 serves as a relatively long time constant filter network, allowing only slow variations in bias voltage to be applied to the control electrode 18 of the triode 15. The bypass capacitor 24 is, therefore, charged to a voltage equal to that across the coupling capacitor 4, this voltage being the amount of average negative voltage on the respective grids 5 and 18 of triodes 6 and 15.

The value of resistance 20 is normally many times that of resistance 19; hence, little practical difference obtains if the alternative connection 20′ is used.

Since the load resistance 22 also forms a part of the grid circuit of the triode 15, the potential variations at the cathode 16 are substantially equal to those at the grid 18. Furthermore, potential changes at the tap 21 on the load resistance 22 correspond nearly exactly with potential changes at the cathode 16; however, some attenuation results from the voltage divider action of potentiometer 22. Therefore, the potential at the cathode 13 of the diode 12 follows, with a slight loss, slow variations in potential applied to the grid 18 of the triode 15. Furthermore, the direct potential at the anode 14 of the diode 12 follows that appearing at the cathode 13, since the voltage developed across the resistance 20 is almost solely a function of the applied alternating voltage across the resonant circuit 1.

If we now assume a contant alternating signal voltage applied to the anode 14 of the diode 12, a certain direct voltage is initially applied to the control electrode 18 of the triode 15, a slight time delay being caused by the filter action of resistance 19 and capacitance 24. The following action of the triode 15 in controlling the direct potential of the cathode 13 of the diode in accordance with the potential at the grid 18 results in a further change in the grid potential. This following action is cumulative until a final equilibrium condition obtains.

Thus, the direct potential appearing at the grid 18 of the control triode 15 is controlled by the amplitude of the oscillatory voltage appearing across the parallel resonant circuit 1. Furthermore, the sensitivity of this grid voltage control is dependent on the amplification of the triode 15, greater sensitivity obtaining from greater amplification. If, for example, the amplification of the triode 15 is thirty-three times, a $^1/_{34}$-volt change in the amplitude of the oscillatory voltage results in a $^{33}/_{34}$-volt change in the direct potential at the cathode 13 of the diode. The change of voltage at the grid 18 of the triode 15 is then $^1/_{34}$-volt greater than that appearing at the cathode 13, or one volt. Since the direct bias potential on the grid 5 of the oscillator tube 6 is substantially equal to that on the grid 18 of the control triode 15, the direct grid potential of the oscillator tube 6 also undergoes a 1-volt change. Moreover, the direction of control is such that an increase in the oscillatory voltage amplitude results in a change in the bias potential of oscillator tube 6 in such a direction as to decrease its average anode current, resulting in a decrease in average mutual conductance. Since the amplitude of oscillation in such a circuit is, for normal operating conditions, an increasing function of mutual conductance, any change in the oscillation voltage amplitude, whether an increase or a decrease, results in a change in the bias potential of oscillator tube 6 in such a direction as to counteract the original amplitude change. If the control circuit of my invention is employed, the $^1/_{34}$-volt change of amplitude results in a 1-volt change in the bias voltage appearing at the grid 5 of the oscillator tube 6, which compares for the same change in oscillation voltage, with somewhat less than $^1/_{34}$-volt bias voltage change obtained with a similar conventional oscillator having only a grid leak resistance.

The foregoing example has assumed a $^1/_{34}$-volt change in the strength of oscillation and has shown that a resulting regulating potential change of one volt is obtained. This 1-volt regulating potential change is applied to the oscillator control grid in such a manner as to counteract almost entirely the assumed original change; hence the ultimate change in output voltage is only a small fraction of that appearing in an otherwise identical oscillator regulated only by the conventional grid leak resistance.

Regulation of the amplitude of the oscillation, however, is but one of the benefits derived from the use of my invention. The movable tap 21 on the load resistor 22 in the cathode follower circuit provides a smooth and effective control over the output voltage amplitude. Furthermore, this arrangement allows the control circuit to operate effectively at any chosen output voltage amplitude. Moreover, by the use of my control circuit, the signal applied to the grid 5 of oscillator tube 6 is normally maintained at a sufficiently low level so that the harmonic currents flowing in the anode circuit are small in comparison with the fundamental component; as a result, the harmonic components of the output voltage are effectively reduced. An additional reduction of the harmonic components of the output voltage is obtained due to the inherent selectivity of oscillatory circuit 1. Consequently, the output voltage waveform is a nearly pure sinusoid. Therefore, my invention provides means for operating an oscillator at such a level that harmonic distortion in the output is minimized, while maintaining the output voltage amplitude substantially constant. Since frequency stability and harmonic distortion are mutually interdependent in most oscillators, and since the output wave form has been shown to be substantially uniform, the frequency stability of this oscillator is enhanced by the use of my control circuit.

In actual tests of the circuit of Fig. 1, I have found that the performance of the oscillator and control system is in substantial agreement with the foregoing disclosure. As an additional modification, I have also provided a wide tuning range by switching the inductance 1 in the conventional manner. In one application, the output frequency was tunable over a range of from 18 to 30,000 kilocycles per second. Merely by way of illustration, the tubes and parameters employed as the elements of the circuit of Fig. 1 were:

Oscillator tube 6, type 6J5 triode.
Device 12, one half of a type 6SL7GT twin triode connected as a diode.
Device 15, the second half of the type 6SL7GT twin triode.
Resistance 10, 1000 ohms.
Resistance 19, 500,000 ohms.
Resistance 20, 10 megohms.
Resistance 22, 100,000 ohms.
Capacitance 4, 0.01 mfd.
Capacitance 11, 0.5 mfd.
Capacitance 23, 0.01 mfd.
Capacitance 24, 0.1 mfd.
Voltage B+, 200 volts.
Voltage C—, —100 volts.

Furthermore, I have found that none of these parameters critically affects the performance of the system; consequently, inexpensive commercial components may be used.

Figure 2:
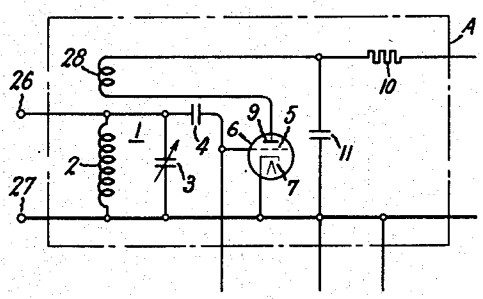

Referring to Fig. 2, there is shown a modification of the portion of the circuit of Fig. 1 enclosed in the broken-line rectangle A. In this variation, the cathode 7 of the oscillator tube 6 is connected directly to ground, and the feedback from the anode 9 to the control electrode 5 is provided by means of an inductance coil 28 which is magnetically coupled to the inductance 2 in the tuned circuit 1.

Figure 3:
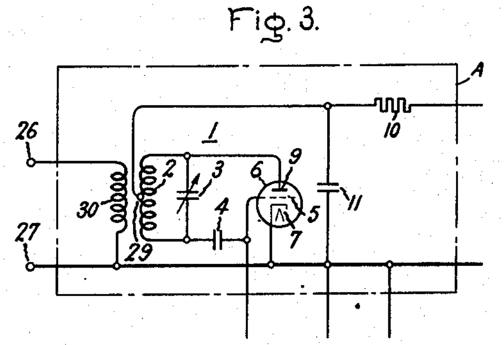

Fig. 3 shows a further modification of the oscillator circuit within the rectangle A, in which the parallel resonant circuit 1 is connected between the anode 9 and the control electrode 5 of the oscillator tube 6. Feedback is provided from the grounded cathode 7 to the tuned circuit 1 through the bypass condenser 11 to a center tap 29 on the inductance 2. The output terminals 26, 27 are magnetically coupled to the inductance 2 by means of a coil 30.

In other respects, the operation of the circuits of Figs. 2 and 3 is identical with that of Fig. 1. Thus it will be seen that I provide means for regulating the amplitude, waveform, and frequency stability of the output voltage of many types of tuned-circuit oscillators.

Figure 4:
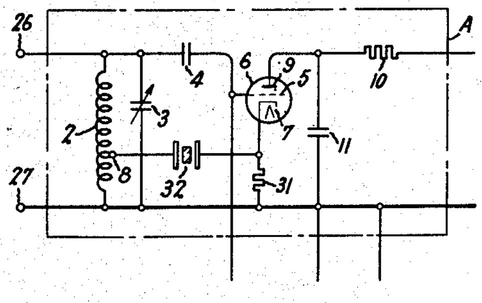

Fig. 4 shows a stabilized crystal-controlled oscillator circuit which may be inserted within the broken-line rectangle A of Fig. 1, other elements of the circuit being identical with those of Fig. 1. The cathode 7 of the oscillator tube 6 is connected to ground through a cathode bias resistor 31 and feedback from the cathode 7 to the tuned circuit 1 is provided through a piezo-electric crystal 32. Since the crystal 32 has an inherent sharp series-resonant frequency, oscillation in the tuned circuit 1 is sustained at a substantially constant frequency. The circuit shown in Fig. 4 is specifically disclosed and claimed in my copending application Serial Number 484,733, filed April 27, 1943, for Crystal Oscillator Circuits, now U. S. Patent No. 2,452,951, and which is assigned to the same assignee as the present application.

Figure 5:
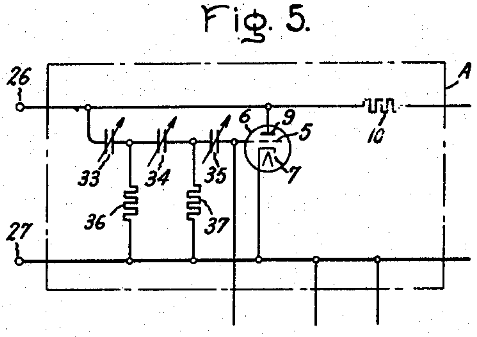

The control circuit of Fig. 1, comprising that portion of the circuit outside the rectangle A, may also be used to regulate the output of a resistance-capacitance phase shift oscillator, such as is shown in Fig. 5. Oscillation is sustained by means of feedback from the anode 9 to the grid 5 of the oscillator through a network which shifts the phase of the anode voltage substantially 180 degrees. In the illustrated circuit, these means comprise three series variable capacitors 33, 34, 35 and two shunt resistors 36, 37. A third shunt resistance is required for oscillation; this resistance is provided by a suitable choice of resistances 19, 20 in conjunction with diode 12. Oscillation is sustained when each combination of a series capacitance and a shunt resistance, capacitance 33 and resistance 36, for example, effects an average phase shift of substantially 60 degrees. The frequency of oscillation is controlled by adjustment of the variable capacitance 33, 34, 35. The operation of the control circuit is identical with that set forth in explanation of the operation of the circuit of Fig. 1.

From the preceding disclosure, it will be apparent that a similar control action may be obtained by modifying the circuit shown in Fig. 1. For example, by inverting diode 12 and connecting potentiometer 22 directly between the anode 17 of control triode 15 and B+, an amplified control potential may be tapped from resistance 22 and applied to the grid 5 of oscillator tube 6. In such a modification, cathode 16 of control triode 15 would be connected directly to C—.

While I have shown certain specific embodiments of my invention and suggested various modifications thereof, it will be understood that numerous other modifications may be made, and I contemplate in the appended claim to cover all such modifications as fall within the true spirit and scope of my invention.

What I claim as new and desire to secure by Letters Patent of the United States is:

In combination an oscillation generator comprising a frequency determining circuit, an electron discharge device comprising a control electrode, a feed-back connection between said circuit and said control electrode for sustaining oscillations in said generator, means for applying a unidirectional bias potential to said control electrode for controlling the amplitude of the oscillations comprising a rectifier, said rectifier comprising a cathode and an anode, a load impedance connected between said cathode and anode, a second electron discharge device comprising a cathode, an anode and a control grid, a filter network, means for connecting said rectifier anode to said control grid through said filter network, a source of negative unidirectional potential, a potentiometer connected between said electron discharge device cathode and through said source of negative potential to a point of reference potential, means for connecting said rectifier cathode to a tap on said potentiometer, a source of positive unidirectional potential, and means for connecting said electron discharge device anode through said positive potential source to said point of reference potential.

DONALD E. NORGAARD.

REFERENCES CITED

The following references are of record in the file of this patent:

UNITED STATES PATENTS

| Number | Name | Date |
|---|---|---|
| 2,043,092 | Black | June 2, 1936 |
| 2,264,369 | Golicke | Dec. 2, 1941 |
| 2,320,876 | Marby | June 1, 1943 |
| 2,369,953 | Downey | Feb. 20, 1945 |
| 2,424,905 | Scheldorf | July 29, 1947 |
| 2,444,349 | Harrison | June 29, 1948 |